United States Patent [19]

Van Veersen

[11] 3,963,689

[45] June 15, 1976

[54] POLYMERIC MATERIALS

[75] Inventor: Gerardus Johannes Van Veersen, Gaude, Netherlands

[73] Assignee: Emery Industries, Inc., Cincinnati, Ohio

[22] Filed: Jan. 28, 1975

[21] Appl. No.: 544,724

Related U.S. Application Data

[62] Division of Ser. No. 327,287, Jan. 29, 1973, Pat. No. 3,881,867.

[52] U.S. Cl. .................................... 526/6; 8/169; 8/177 AB; 8/179; 526/351; 526/321; 260/75 T
[51] Int. Cl.² .................. C08L 23/12; C08L 67/00
[58] Field of Search ................ 260/93.7, 75 T

[56] References Cited
UNITED STATES PATENTS 2,993,926  7/1961  Stenberg et al. .............. 260/465.2
3,114,588  12/1963  Lewis .................................. 8/93
3,415,767  12/1968  Kelly .............................. 260/27 R

OTHER PUBLICATIONS

Docheva et al., *Chemical Abstracts*, vol. 56: 8923g (1962).

*Primary Examiner*—Murray Tillman
*Assistant Examiner*—W. C. Danison
*Attorney, Agent, or Firm*—Gerald A. Baracka; John D. Rice

[57] ABSTRACT

Polymeric materials of improved dyeability and other properties are provided which consist of polypropylene or polyester material and a small percentage of a nitrile which contains 20–75 carbon atoms and 2–4 nitrile groups in the molecule. Processes for preparing these improved polymeric materials and methods for dyeing these materials are also provided.

8 Claims, No Drawings

POLYMERIC MATERIALS

This is a division of application Ser. No. 327,287, filed Jan. 29, 1973, now U.S. Pat. No. 3,881,867.

BACKGROUND OF THE INVENTION

It is generally known that certain polymeric materials take up and retain most dyestuffs to an insufficient extent. Examples of such polymeric materials are polyalkylenes, more in particular poly-alpha-olefins such as polypropylene and polyethylene, and furthermore polyesters. The difficulty in dyeing these polymeric materials has had a restricting effect on their applicability to fibres, mono-filaments and foils.

Various possibilities have been proposed to increase the capacity of these polymeric materials to take up and retain dyestuffs. Thus it has been proposed to degrade the surface of the polymer slightly by oxidizing or radiation, by grafting or copolymerization and by incorporating suitable materials in the polymer. The incorporation of additives in the polymer is generally preferred because it avoids extra manufacturing steps. Moreover, the additive used may also impart secondary beneficial properties to the polymeric material.

SUMMARY OF THE INVENTION

It has now been found that the capacity of certain of the above-mentioned polymeric materials to take up and retain dyestuffs can be improved by incorporation of an effective amount of certain di- or polynitriles of high molecular weight (defined and further herein below referred to as higher polynitrile) in the polymeric material. The invention thus provides polymers of improved dyeability and processes for the preparation of such polymers.

Improvement in the dyeability is of particular importance for polymeric material used in the manufacture of fibres and the invention therefore provides in particular a method for preparing improved polymeric materials such as polypropylene and polyesters.

DETAILED DESCRIPTION

The improved polymeric materials according to the invention belong to the class consisting of polypropylene, in particular crystalline polypropylene, and polyester materials in which a small percentage of a higher polynitrile is incorporated together with the customary minor amounts of other additives. Copolymers and terpolymers of polypropylene or polyesters possessing properties that render them suitable for use as fibre materials which are similar to the homopolymers are regarded as obvious equivalents of polypropylene and polyester respectively.

The amount of higher polynitrile incorporated generally ranges from a fraction of a percent, say 0.5 calculated per 100 parts resin ($p\,h\,r$), to 15% ($p\,h\,r$) preferably 0.5–5 $p\,h\,r$. This range depends among other things on the nature of the polymeric material. In the case of certain polyester materials incompatibility may arise when more than 3 $p\,h\,r$ of higher polynitrile is incorporated. Incorporating too high a quantity of higher polynitrile may cause lowering of the melting point of the polymer to an unacceptable extent.

The higher polynitrile may contain from 20–75 preferably 25–60 carbon atoms in the molecule and 2–4 nitrile groups. The presence of carbon to carbon double bonds is not required but does not interfere either and up to two of these double bonds may be present in the molecule. A balance of one nitrile group per 15–22 carbon atoms is particularly preferred, i.e. dinitriles containing 30–44 carbon atoms and trinitriles containing 45–66 carbon atoms. In view of this balance the higher polynitrile is conveniently prepared from naturally occurring fatty acid starting materials, i.e. from saturated or unsaturated monocarboxylic acids containing 16–22 carbon atoms which are polymerized and the carboxylic groups of which are subsequently converted into nitrile groups. These preferred polynitriles thus contain a hydrocarbon group which is identical with that of the polymerized fatty acid. Under polymerized fatty acid is to be understood fatty acids which have been polymerized or coupled via e.g. styrene or a homologue thereof or direct, optionally followed by hydrogenation of carbon to carbon double bonds. These polymerization reactions are known in the art to yield dicarboxylic, tricarboxylic acids or mixtures thereof, sometimes also containing a minor amount of higher polymeric materials. The unconverted monomeric starting materials are easily stripped off and the reaction mixture optionally separated into fractions consisting of dimers, trimers or higher polymers before the carboxylic groups are converted into nitrile groups. As stated above polymerized fatty acids can be prepared by heteropolymerization involving fatty acids and unsaturated compounds like sytrene or homologues thereof and by homopolymerization in which two or more fatty acid molecules are coupled. Homopolymerization of unsaturated fatty acids can be effected by heat-treatment usually in the presence of catalysts such as monomorillonite clays and dimers, trimers and higher oligomers are formed. Fatty acids which can thus be polymerized are e.g. oleic, linoleic and linolenic acid, their positional isomers and homologues thereof. Unsaturated fatty acids or mixtures thereof which contain 18 carbon atoms in the molecule are readily available and then yield dimeric acids containing 36, trimeric acids containing 54 and tetrameric acids containing 72 carbon atoms in the molecule and the corresponding polynitriles.

Conversion of the polymerized fatty acid into the polynitrile can be effected by reacting with ammonia and subsequent heating, thereby dehydrating and forming the nitrile which can be used as such or after further purification. Under dimer dinitrile is to be understood the dinitrile of dimeric fatty acid as e.g. dioleic acid, dilinoleic acid or dilinolenic acid and under trimer trinitrile the corresponding trinitrile.

The higher polynitrile may be incorporated into the polymeric material in various ways, e.g. by adding to the molten polymer, by coating particles of polymer and subsequently fusing into a melt. The particles can be coated spraying or tumbling in a drum. The polymeric material is then worked by conventional methods into sheets, foils, monofilaments or fibres. The incorporation of the higher polynitrile in the polymeric material frequently imparts better rheological properties to the melt, which then e.g. flows more easily in the extruder, thereby increasing its throughput.

The invention thus provides polymeric materials such as polyalkylenes, more in particular poly-alpha-olefins such as crystalline polypropylene and polyethylene containing 0.5 to 15 parts per 100 parts resin, preferably 0.5–5 $p\,h\,r$ of a higher polynitrile to which many dyestuffs will adhere more firmly and lastingly than to the corresponding fibres without the higher polynitrile.

The polymeric materials according to the invention can be dyed under mild conditions at a relatively low temperature, i.e. below 100° C such as e.g. those applied for natural materials like cotton and wool, yielding bright colored products. Many dyestuffs can be used when dyeing the polymers according to the invention, including the majority of those customarily used for cotton and wool, disperse dyestuffs and in particular dyes containing basic nitrogen atoms such as aniline dyes. Some of these dyes tend to be unstable and discolor when exposed to use conditions; they lose their brilliancy and fade. Certain dyed polymeric materials containing the higher polynitrile retain their brilliancy over prolonged periods even under conditions including exposure to daylight, rubbing and scouring so that the higher polynitrile in the polymer appears to stabilize these dyestuffs. In some instances the antistatic properties of the polymer appeared to have been improved by the polynitrile. The polynitrile also appears to increase the output of the extruder and facilitates the stretching process. Consequently according to the invention in addition to improving the dyeability one or more of the advantages mentioned above may be secured.

EXPERIMENTS

Preparation of dimerdinitrile.

1000 g of polymeric fatty acid predominantly consisting of dimeric fatty acids (Empol 1022, manufactured by and commercially obtainable from Unilever-Emery N.V., Gouda, The Netherlands) were introduced into a four-necked flask. Two g of zinc oxide and 5 g of hypophosphoric acid (50%) were added, the flask was placed in a fume cupboard and equipped with: (a) a fast rotating stirrer, (b) a thermometer, (c) a gas inlet tube with the open end just below stirrer, (d) a condenser cooled with water of 65°–90° C, which was connected to a receiver with an open gas outlet.

Nitrogen was introduced and the flask and contents heated to 150° C whilst stirring at this temperature, the introduction of ammonia through the gas inlet tube was started and heating was gradually increased to 275°–280° C.

Unreacted ammonia together with reaction water condensed partially in the condenser or escaped. Ammonia soap formed in the condenser was removed mechanically when it tended to clog the condenser. Bubbling through ammonia was continued for 3–4 hours and terminated when the acid value of the reaction mixture was below 0.5 and the amide content below 0.1 milli-equivalents per gram.

The reaction product was then subjected to a 10 mm mercury (absolute) vacuum at 200° C for 15 minutes, cooled in vacuo to 80° C and filtered. Thus dimer dinitrile, a light amber colored viscous liquid in a yield of 91%; $n_{25}^D$: 1.4787; b.p. 310° C / 7mm Hg, acid value 0.12, amide content 0.0027 milli-equivalents per gram and an ash content of 0.01% was obtained.

PREPARATION OF TRIMER TRINITRILE

In the same was as described for dimer dinitrile trimer trinitrile was prepared frm Empol 1040, manufactured by and commercially obtainable from Unilever-Emery N.V., Gouda, The Netherlands, a mixture of polymeric fatty acids mainly consisting of trimeric and higher oligomeric fatty acids. Formation of ammonia soap in the condenser, however, hardly occurred. Thus trimer trinitrile, $n_{25}^D$: 1.4898, a dark amber colored viscous liquid, was obtained in a 98% yield, b.p. 350° C/7 mm Hg, acid value 0.26, amide content 0.026 milli-equivalents per gram and an ash content of 0.1%.

EXAMPLES 1 – 4

Several samples consisting of 100 parts of polypropylene ("Carlona PM 61 naturel" ex Rotterdam Polyolefin Company, Pernis, The Netherlands) were milled in a two-roller mill at a friction of 1 : 1.3 at a temperature between 180° and 190° C for 20 minutes with and without addition of a dimer dinitrile and trimer trinitrile described above in quantities as indicated below. Dimer dinitrile and trimer trinitrile were prepared respectively from Empol 1022 and 1040 dimer and trimer acids manufactured by and commercially obtainable from Emery Industries, Inc., Cincinnati, Ohio by polymerization of unsaturated fatty acids.

|  | Blank | Ex. 1 | Ex. 2 | Ex. 3 | Ex. 4 |
|---|---|---|---|---|---|
| Parts polypropylene | 100 | 100 | 100 | 100 | 100 |
| Parts dimer dinitrile (b.p. 310° C/7 mm Hg) | — | 5 | — | — | — |
| Parts trimer trinitrile (b.p. 350° C/7 mm Hg) | — | — | 5 | 3 | 1 |

After completion of the milling operation granules were made by cutting the mill sheets. The blank and the compounds according to the Examples 1 – 4 were spun with a Reiffenhauser SO 13.1. BT/65 extruder, the screw of which was operating at a speed of 21 rpm. In the blank extrusion occurred at a speed of 57 meters per minute. On comparison with the blank the output of the extruder was considerably higher when the compounds according to Examples 1 – 4 were extruded under otherwise identical conditions. The output of the extruder is tabulated below:

| Compound | Output g/hr | Increase % |
|---|---|---|
| Blank | 123 | — |
| Ex. 1 | 134 | 12 |
| Ex. 2 | 143 | 19 |
| Ex. 3 | 134 | 12 |
| Ex. 4 | 134 | 12 |

The mixture of Example 3 excelled in ease of processing, extrusion and subsequent stretching.

After the continuous polypropylene monofilament thus obtained had been cooled and collected on a spool, it was unrolled and stretched by passing over a Pyrovane Honeywell heating plate having a temperature of 125° C. Each of the monofilaments was thus uniformly necked in a predetermined place and stretched according to stretch ratios between 1 : 3 and 1 : 4 and wound up into skeins. The original monofilament of 315 denier was thus converted into a monofilament of 100 – 75 denier.

Dyeing of the skeins of the blank and the compounds according to Examples 1 – 4 was carried out in a dye bath containing 500 mg of dye as indicated below per liter of water.

| Dyestuff | Color Index Reference | Color obtained |
|---|---|---|
| Auramine ON 150 | 41000 | bright yellow |

-continued

| Dyestuff | Color Index Reference | Color obtained |
|---|---|---|
| Victoria Blue BN 150 | 44045 | intense blue |
| Rhodamine BN 450 | 45170 | red |
| Methylene Blue 2 BN 150 | 52015 | bright blue |

Dyeing took place for 1 hour at 80° C; the skeins were then washed with distilled water and dried at room temperature. Visual judgment of the dyed filaments on comparison with the blanks showed that for all dyes the various compounds containing the higher polynitrile showed intenser colors and therefore had a better dye retention than the blank.

In this series of Examples dye retention decreased in the sequence 1, 2, 3 and 4.

EXAMPLES 5 – 6

Samples of polypropylene ("Carlona PM 61 naturel" ex Rotterdam Polyolefin Company) were milled with and without addition of dimer dinitrile and trimer trinitrile at 185° C for 8 hours in quantities as indicated below.

| | Blank | Ex. 5 | Ex. 6 |
|---|---|---|---|
| Parts polyolefin | 100 | 100 | 100 |
| Parts dimer dinitrile (b.p. 310° C, 7 mm Hg) | — | 5 | — |
| Parts trimer trinitrile (b.p. 350° C, 7 mm Hg) | — | — | 5 |

The compounds according to Example 5, 6 and the blank were pressed to sheets of 0.5 mm thickness at 200° C for 4 minutes.

Dyeing of pieces of sheet was carried out at 80° C for 1 hour in solutions containing 500 mg of dye per liter. The dyes used were:

| Dyestuff | Color Index Reference | Color Obtained |
|---|---|---|
| Auramine ON 150 | 41000 | bright yellow |
| Victoria Blue BN 150 | 44045 | blue |
| Rhodamine BN 450 | 45170 | red |
| Methylene Blue BN 150 | 52015 | bright blue |

The blank had taken up a negligible amount of dye, showing pale colors, whereas the sheets containing the higher dinitrile were bright-colored.

What is claimed is:

1. A polymeric material comprising a synthetic resin selected from the group consisting of polypropylene and polyester; and from 0.5 to 15 parts, per hundred parts of the resin a polymerized fatty acid nitrile containing 20 to 75 carbon atoms, 2 to 4 nitrile groups and a maximum of two carbon-carbon double bonds.

2. The polymeric material of clam 1 wherein the polymerized fatty acid nitrile contains 25 to 60 carbon atoms and has a ratio of 15 to 22 carbon atoms per nitrile group.

3. The polymeric material of claim 2 which contains between 0.5 to 5 parts of the polymerized fatty acid nitrile per hundred parts resin.

4. The polymeric material of claim 3 wherein the synthetic resin is crystalline polypropylene.

5. A process for preparing polymeric materials having improved dyeability which comprises incorporating into a synthetic resin selected from the group consisting of polypropylene and polyester from about 0.5 to 15 parts, per hundred parts of the resin a polymerized fatty acid nitrile containing 20–75 carbon atoms, 2 to 4 nitrile groups and a maximum of two carbon-carbon double bonds.

6. The process of claim 5 wherein the polymerized fatty acid nitrile contains 25 to 60 carbon atoms and has a ratio of 15 to 22 carbon atoms per nitrile group.

7. The process of claim 6 wherein 0.5 to 5 parts of the polymerized fatty acid nitrile is incorporated per hundred parts polymer.

8. The process of claim 7 wherein the synthetic resin is crystalline polypropylene.

* * * * *